United States Patent
Jin et al.

(10) Patent No.: US 8,654,890 B2
(45) Date of Patent: Feb. 18, 2014

(54) ADAPTIVE REAL-TIME CONTROL OF DE-EMPHASIS LEVEL IN A USB 3.0 SIGNAL CONDITIONER BASED ON INCOMING SIGNAL FREQUENCY RANGE

(75) Inventors: Huawen Jin, Plano, TX (US); Jawaid Ahmad, Plano, TX (US); Yaqi Hu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 237 days.

(21) Appl. No.: 13/325,685

(22) Filed: Dec. 14, 2011

(65) Prior Publication Data

US 2013/0156088 A1     Jun. 20, 2013

(51) Int. Cl.
*H04L 25/49*     (2006.01)
*H03H 7/40*     (2006.01)

(52) U.S. Cl.
USPC .......................................... 375/296; 375/232

(58) Field of Classification Search
USPC ................. 375/232, 236, 295–297; 455/63.1, 455/114.2–114.3
See application file for complete search history.

(56) References Cited

U.S. PATENT DOCUMENTS

| | | | |
|---|---|---|---|
| 7,787,564 B1* | 8/2010 | Anvari | 375/297 |
| 8,478,210 B2* | 7/2013 | Gandhi et al. | 455/114.3 |
| 2001/0016015 A1* | 8/2001 | Kaku et al. | 375/296 |
| 2008/0130789 A1* | 6/2008 | Copeland et al. | 375/297 |
| 2012/0106676 A1* | 5/2012 | McCallister et al. | 375/297 |

* cited by examiner

*Primary Examiner* — Khanh C Tran
(74) *Attorney, Agent, or Firm* — Alan A. R. Cooper; W. James Brady, III; Frederick J. Telecky, Jr.

(57) ABSTRACT

An apparatus comprises a differential equalizer having: a) a first differential input, b) a second differential input, c) a first differential output, and d) a second differential output; a frequency detector coupled to the first and second differential inputs; an amplifier coupled to a first differential output and a second differential output of the differential equalizer; and a logical combiner having a first input coupled to an output of the frequency detector and an output coupled to a control input of the amplifier, wherein the logical combiner can mask at least one received de-emphasis parameter.

20 Claims, 9 Drawing Sheets

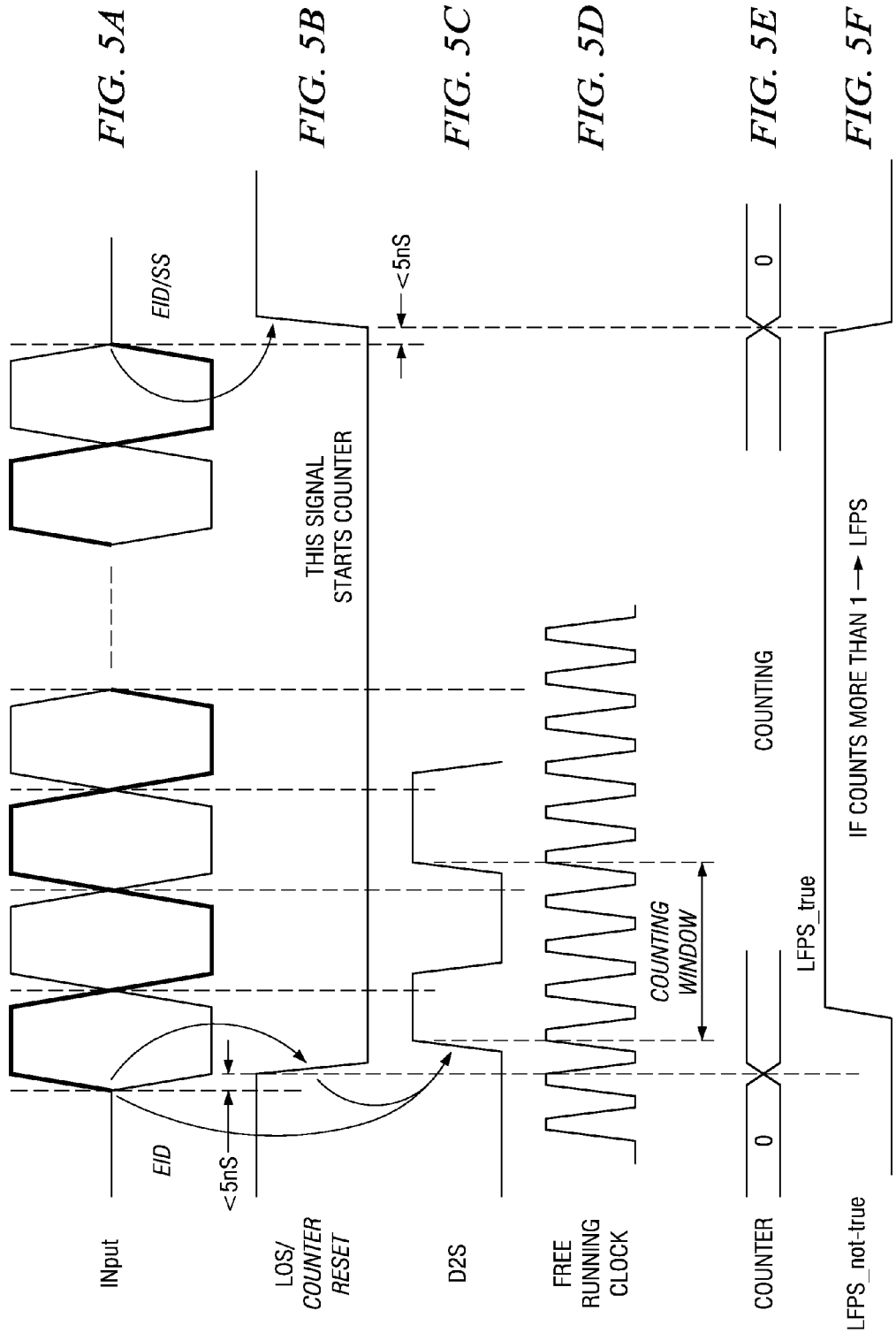

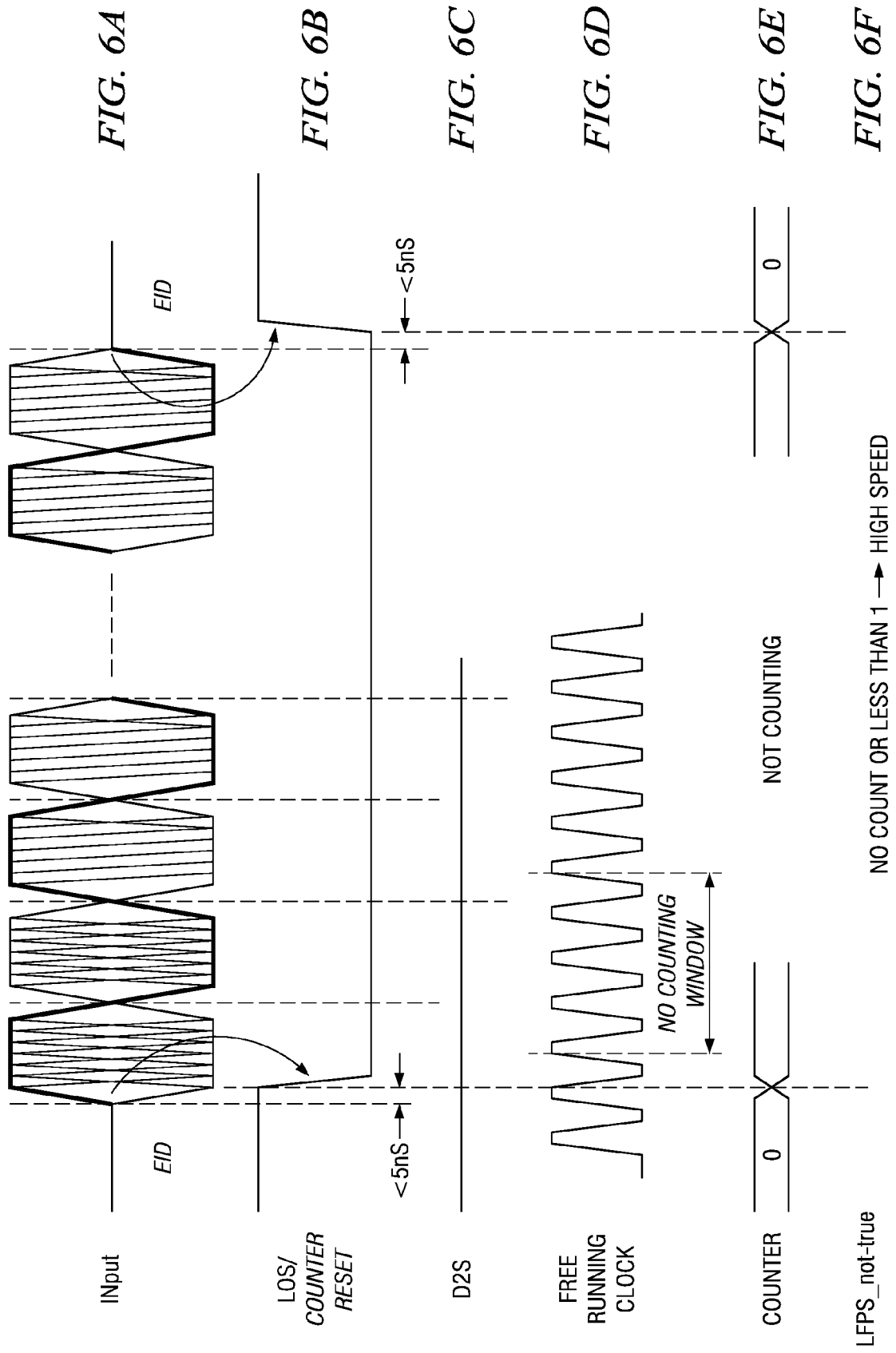

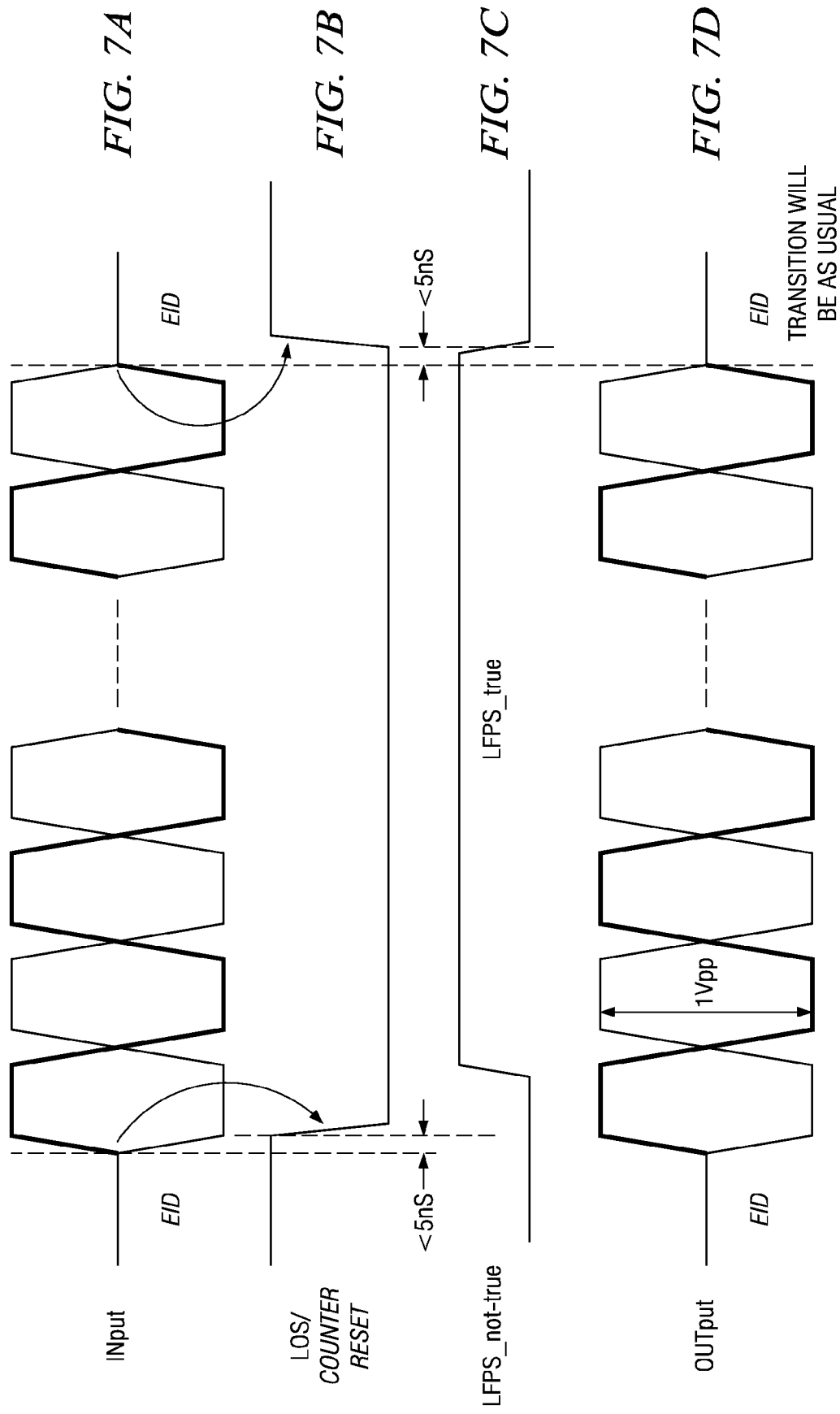

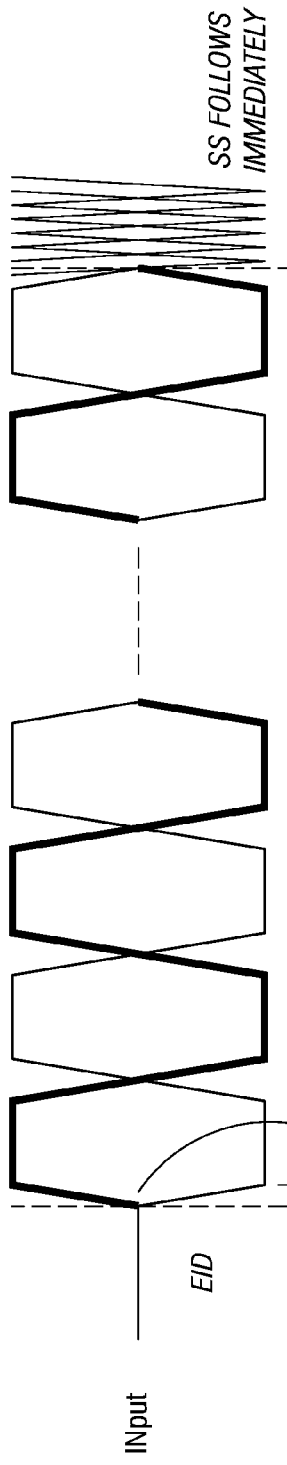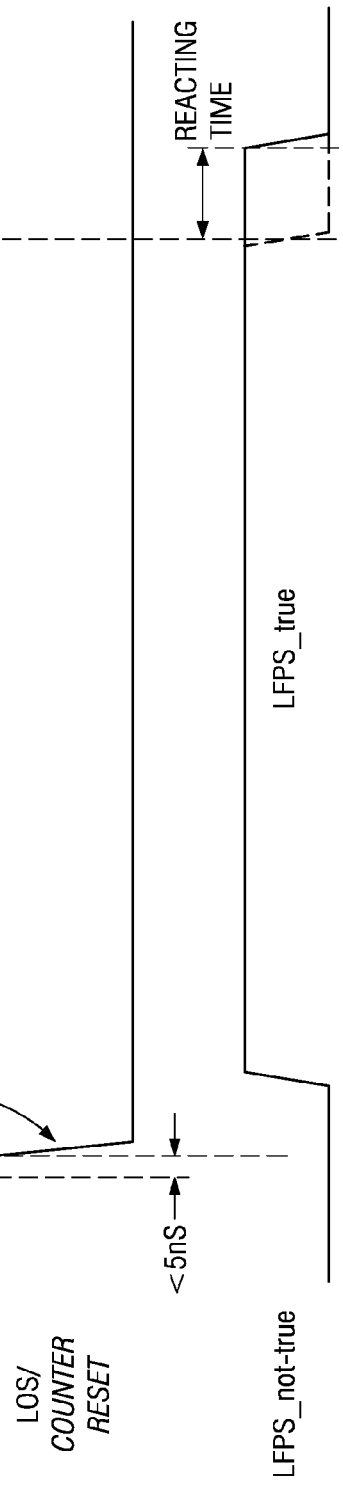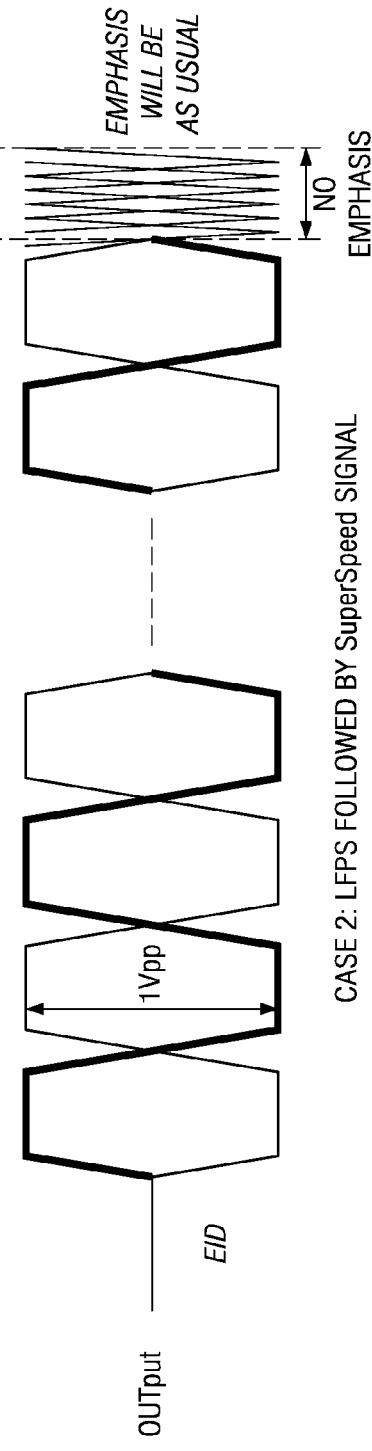
FIG. 8A
FIG. 8B
FIG. 8C
FIG. 8D
CASE 2: LFPS FOLLOWED BY SuperSpeed SIGNAL

ADAPTIVE REAL-TIME CONTROL OF DE-EMPHASIS LEVEL IN A USB 3.0 SIGNAL CONDITIONER BASED ON INCOMING SIGNAL FREQUENCY RANGE

TECHNICAL FIELD

This application is directed, in general, to adaptive real-time control of a de-emphasis level and, more specifically, to adaptive real-time control of a de-emphasis level in a signal conditioner based on an incoming frequency range.

BACKGROUND

A de-emphasis of a signal can be generally defined as reducing a signal level, such as a voltage level, of all bits except the first one after a transition from a value of one to a value of zero in a differential signal, and vice versa. This, in turn, causes a high frequency content of the signal, due to the de-emphasis transition, to be emphasized, when compared to the low frequency content, which is de-emphasized. This is one form of transmitter equalization between high frequencies and low frequencies. This form of transmitter equalization compensates for losses over a transmission channel, which is typically higher at higher frequencies.

A universal serial bus (USB) 3.0 normative LFPS Electrical Specification Table 6-20 calls for a USB 3.0 transmitter or re-transmitter de-emphasis to be applied only to a High Speed 8 bit-10 bit encoded Data Communication Signal (in the "Universal Serial Bus 3.0 Specification", a particular type of this form of signal is referred to as a "SuperSpeed" signal; SuperSpeed will henceforth be discussed, but the principles of the present application can be applied to other communication signals such as High Speed 8 bit-10 bit encoded Data Communication Signals as well) when conveying a USB 3.0 signal, but not to a low frequency periodic signal (LFPS). The USB 3.0 signal will therefore undergo a higher attenuation than a low frequency signal, and to not apply de-emphasis to the LFPS.

However, unlike a host or device in a universal serial bus (USB) 3.0 link, an USB 3.0 re-driver, a type of signal conditioner, is situated in a middle between a transmitter USB connector and a receiver USB connector, and the re-driver should be neither a source nor a sink of a USB 3.0 signal. A conventional re-driver should be transparent to both high frequency periodic signals (such as SuperSpeed) and low frequency periodic signals (LFPS).

However, use of both LFPS and HFS, such as SuperSpeed, in the same re-driver can cause serious issues regarding treatment of their differing signal characteristics between LFPS and SuperSpeed. Some conventional re-drivers disable de-emphasis completely in order to pass USB 3.0 LFPS compliance limits. However, this has a limitation that, for long channels where de-emphasis is needed, USB 3.0 signal integrity is compromised, which results in a high bit error, making the USB 3.0 connection/re-driver/link unusable.

Therefore, there is a need in the art to address at least some of the issues associated with SuperSpeed and LFPS sharing same signal path in re-drivers.

SUMMARY

A first aspect provides an apparatus, comprising: a differential equalizer having: a) a first differential input, b) a second differential input, c) a first differential output, and d) a second differential output; a frequency detector coupled to the first and second differential inputs; an amplifier coupled to a first differential output and a second differential output of the differential equalizer; and a logical combiner having a first input coupled to an output of the frequency detector and an output coupled to a control input of the amplifier, wherein the logical combiner can mask at least one de-emphasis parameter.

A second aspect provides an apparatus, comprising: a differential equalizer having a first differential input and a second differential input; an amplifier coupled to a first differential output and a second differential output of the differential equalizer; a logical combiner having an output coupled to a control input of the amplifier, wherein the logical combiner receives de-emphasis parameters on a first input; and a frequency detector coupled to the first and second differential inputs. The frequency detector includes: a) a differential to single-ended signal logic, b) a counter coupled to an output of the differential to single-ended transformer, c) a clock signal input coupled to the counter, and d) a comparator that can output an LFPS_true or LFPS_not-true signal into a second input of the logical combiner. An amplifier is coupled to the first differential output and the second differential output of the differential equalizer; and a squelch element having an output coupled to the differential equalizer and the comparison element.

In a third aspect, a method comprises: sensing a differential signal; applying a differential to single-ended conversion on the differential input to create a single-ended signal; counting a number of transitions of the single-ended signal in a time period; and determining if the count of the number of transitions is higher than a comparison value. The method further comprises generating an LPFS_true signal if the count of the number of transitions is higher than a comparison value; receiving a de-emphasize parameter; and blocking a conveyance of the de-emphasize parameter to an amplifier of the differential signal if the LPFS_true signal has been generated.

BRIEF DESCRIPTION OF THE DRAWINGS

Reference is now made to the following descriptions:

FIG. 5A illustrates an LFPS signal received by the de-emphasizer of FIG. 4, wherein previously, no signal was being received;

FIG. 5B illustrates a LOS signal 435 goes low (there is now a signal, a LFPS;

FIG. 5C illustrates a differential to single-ended transform of the LFPS signal of FIG. 5B;

FIG. 5D illustrates a counting of a LFPS according to a reference clock signal;

FIG. 5E illustrates a count of a SuperSpeed;

In FIG. 5F, a determination occurs of whether the count of FIG. 5E is greater or equal to a threshold value; if it does, the LFPS_true signal is generated;

FIG. 6A illustrates SuperSpeed signals as received by the de-emphasizer of FIG. 4;

FIG. 6B illustrates a LOS-True signal received over LOS line 435 goes low;

FIG. 6C illustrates a D2S of the LFPS;

FIG. 6D illustrates transitions of the free clock not occurring within a D2S window;

FIG. 6E illustrate no counting because transitions of the free clock do not occur within a D2S window;

FIG. 6F illustrates an output a LFPS_not-true signal;

FIG. 7A illustrates an LFPS signal is received after no signal was received;

FIG. 7B illustrates a LOS/Counter reset signal;

In FIG. 7C, the LFPS_true value is then generated from an LFPS_not-true value;

FIG. 7D, illustrates an initial de-emphasis on the first bit of the LFPS;

FIG. 8A illustrates a previous signal, an LFPS, is followed immediately by a SuperSpeed;

In FIG. 8B, illustrates a LOS/counter reset occurring after a 5 nanosecond or so delay;

Figure 4:
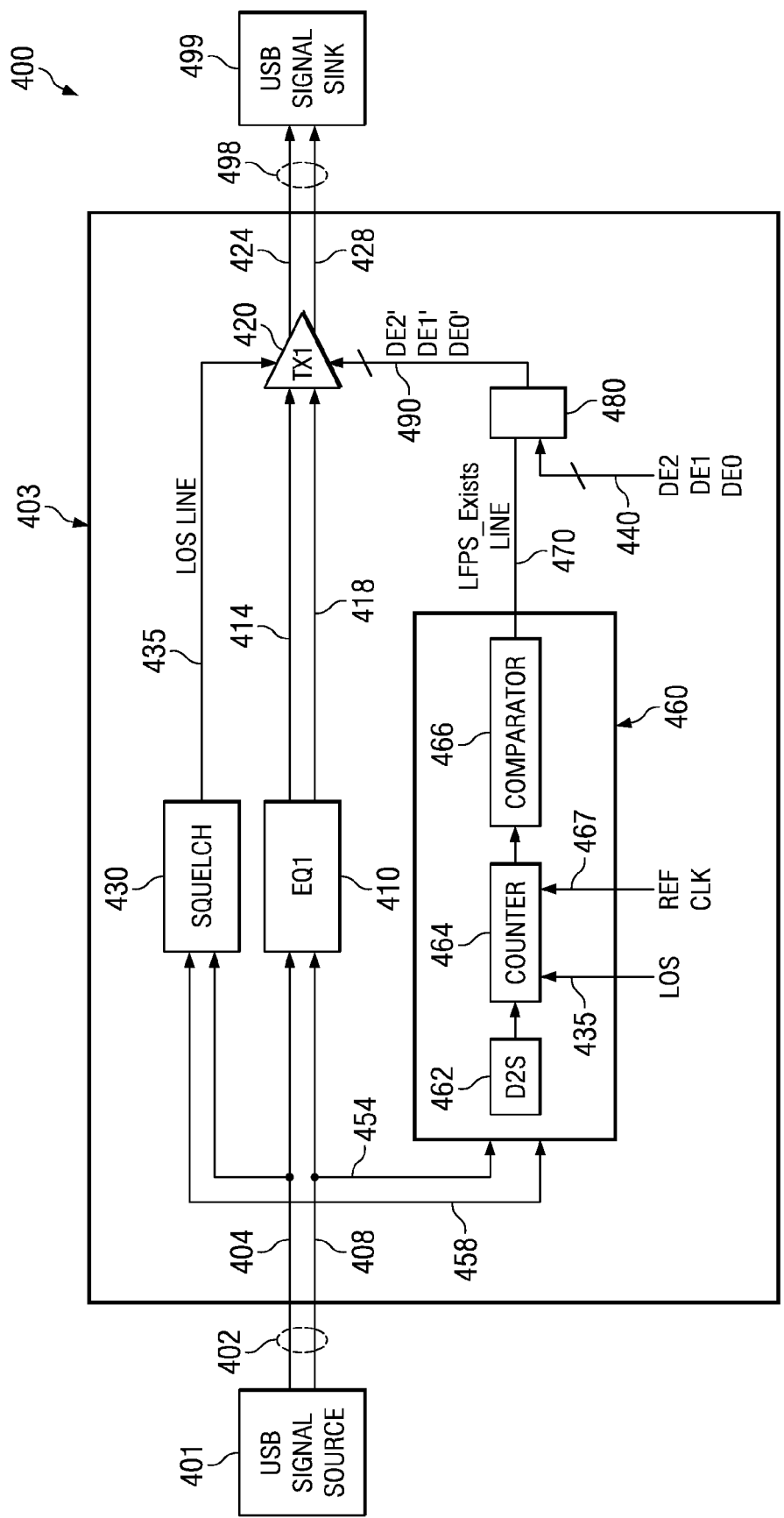
FIG. 4 is an illustration of a USB 3.0 system with a UBB 3.0 re-driver, such as a de-emphasizer, constructed according to the principles of the present application.
Figure 9:
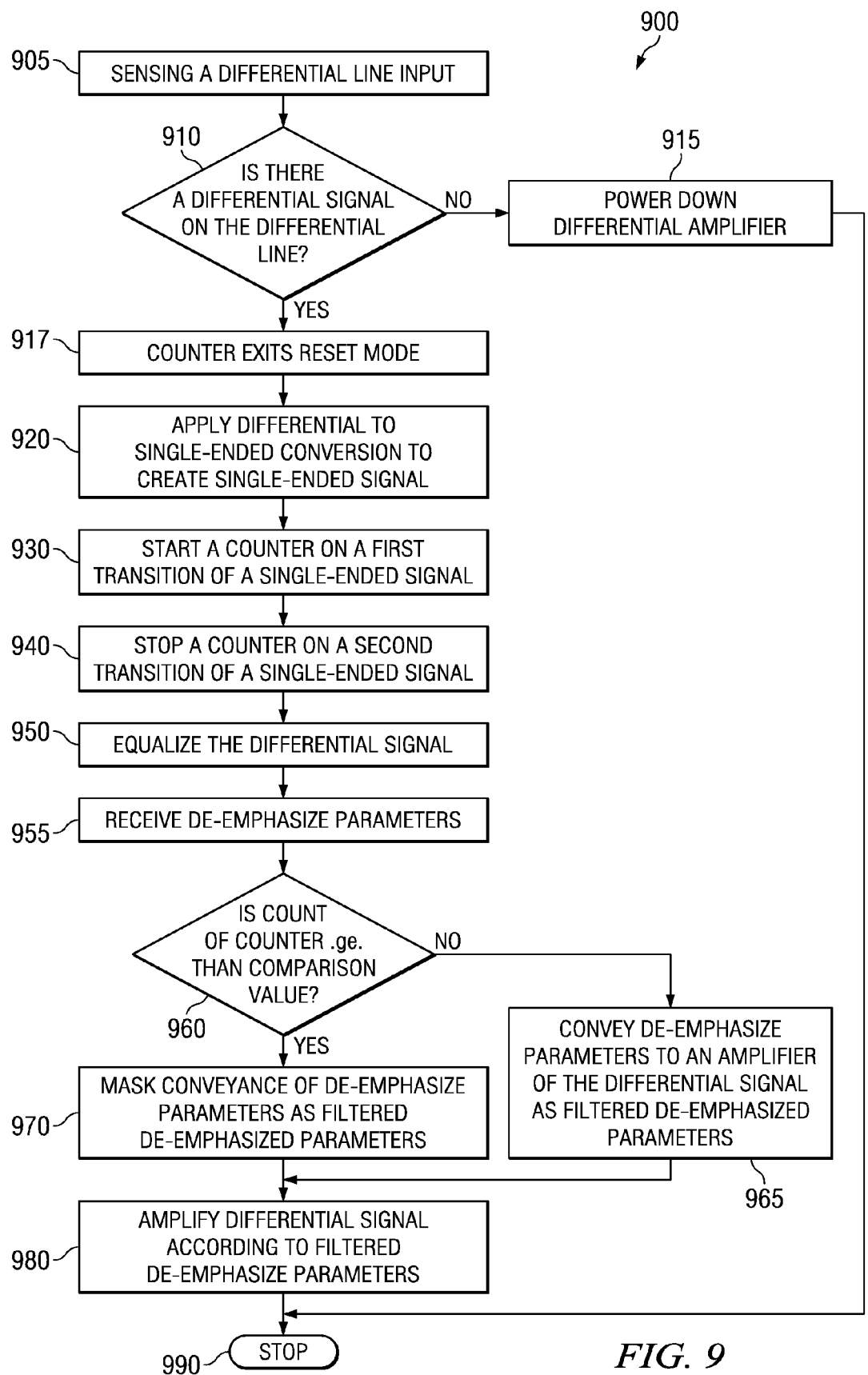
Figure 10:
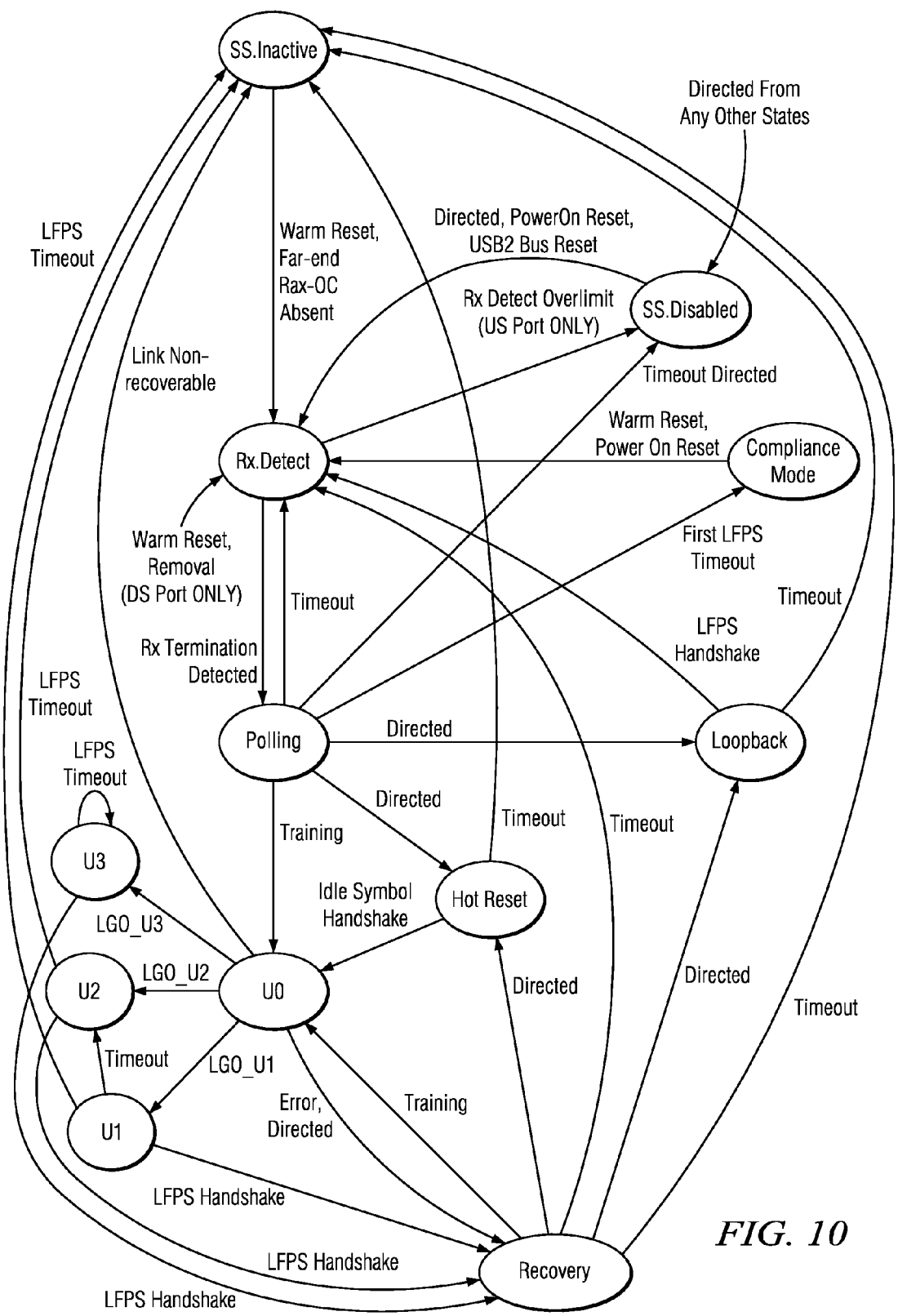

In a FIG. 8C, the LFPS_true signal is generated after another delay. However, there is a reaction time when LFPS becomes SuperSpeed;

In FIG. 8D, as is illustrated, there is a de-emphasis applied to the LFPS signal until the comparator 466 determines that the received signal is a LFPS signal, and masks the conveyance of the de-emphasis values, and instead the filtered de-emphasis values are masked values;

FIG. 8D illustrates an example reaction time of the frequency counter 460 occurs, and the emphasis of de-emphasis will not have as of yet occurred on the LFPS;

FIG. 9 illustrates a method 900 for employing the USB 3.0 re-driver of FIG. 4; and FIG. 10 illustrates a state diagram of a USB 3.0 standard.

DETAILED DESCRIPTION

In conventional technologies, with a single high-speed path (per channel), in a USB 3.0 re-driver, the re-driver transmits an input signal with a fixed de-emphasis of −3.5 dB of the SuperSpeed as required by the USB 3.0 Specification Table 6-"Transmitter Normative Electrical Parameters" of the "Universal Serial Bus 3.0 Specification", Revision 1.0, Nov. 12, 2008. "Universal Serial Bus 3.0 Specification", Revision 1.0, Nov. 12, 2008 is hereby incorporated by reference herein in its entirety.

However, the LFPS signal is also disadvantageously transmitted with a −3.5 dB de-emphasis loss. This de-emphasis of a LFPS in turn results in a reported failure of the re-driver in a 3.0 USB compliance test when such a test is performed at a USB connector that uses the re-driver applying conventional de-emphasis as an intermediary signal conditioner between a source USB 3.0 bus transmitter source and a receiver USB 3.0 bus sink.

Generally, as recognized by the inventors, and as shall be discussed in more detail, a differential de-emphasizer 403 of FIG. 4, below, employs a rate detector, such as a rate detector 460 of the de-emphasizer 403. Generally, a de-emphasis is applied to an HFS, such as SuperSpeed, received in a 3.0 bus re-driver, but not to a LFPS signal received in the 3.0 bus re-driver, allowing the 3.0 re-driver USB signal output characteristics to remain within the requirements of Table 6-20 "Normative LFPS Electrical Specification".

Figure 1A:
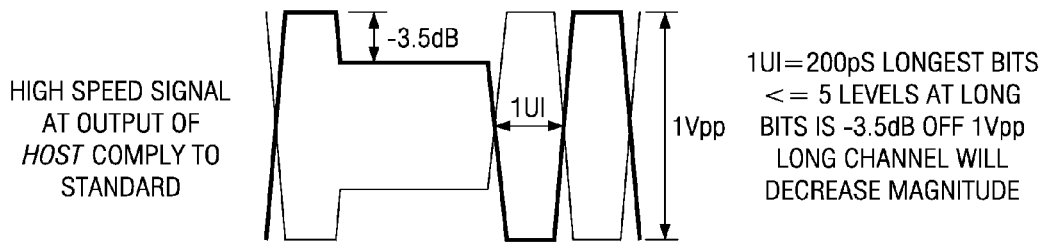
FIG. 1A illustrates a de-emphasis of a SuperSpeed signal as output by an USB 3.0 host.

Turning to FIG. 1A, illustrated is a de-emphasis of a SuperSpeed signal as output by an USB 3.0 host. The bit sequence is shown as differential waveform in bold with NRZ (non-Return-to-Zero) scheme as "1111101". As is illustrated, any bit after the first bit of the SuperSpeed is de-emphasized by 3.5 dB. As is illustrated, one transmission is 200 picoseconds. The first bit is higher than the remaining 4 bits, which are also one. The two bits after the initial 5 bits has duration of 1 bit so there are no de-emphasis performed. As is also illustrated, the de-emphasis of the USB 3.0 bus signal has been substantially neutralized by the attenuation of the USB 3.0 bus channel. The 8 bit-10 bit coding is for DC balancing that has of the most of 5 bits in a row.

Figure 1B:
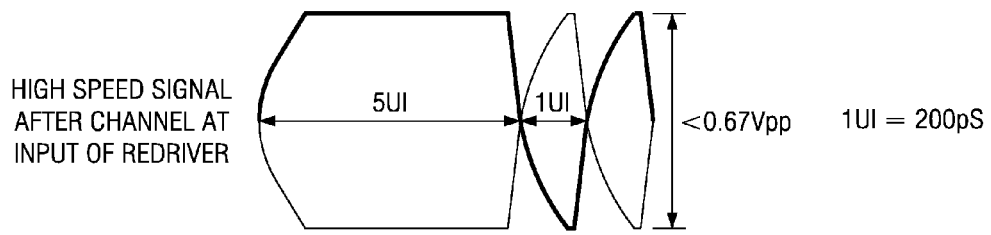
FIG. 1B illustrates the same SuperSpeed signal as received at a conventional re-driver after signal attenuation.

FIG. 1B illustrates the same SuperSpeed signal as received at a re-driver 300. As is illustrated, there is some signal degradation, which can be attributed to such factors as attenuation of high frequency harmonics of the individual bit signals.

Figure 1C:
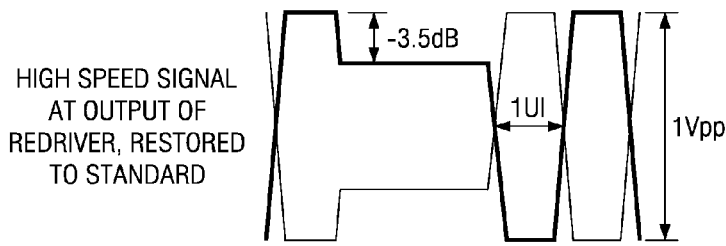
FIG. 1C illustrates the same signal as FIG. 1B. after being re-driven and re-emphasized by the a conventional re-driver.

FIG. 1C illustrates the same signal as FIG. 1B after being re-driven and re-emphasized by the de-emphasizer 300. As is illustrated, the signal is reconditioned to substantially the same as the original signal of FIG. 1A. In other words, de-emphasis has been applied to SuperSpeed.

Figure 2A:
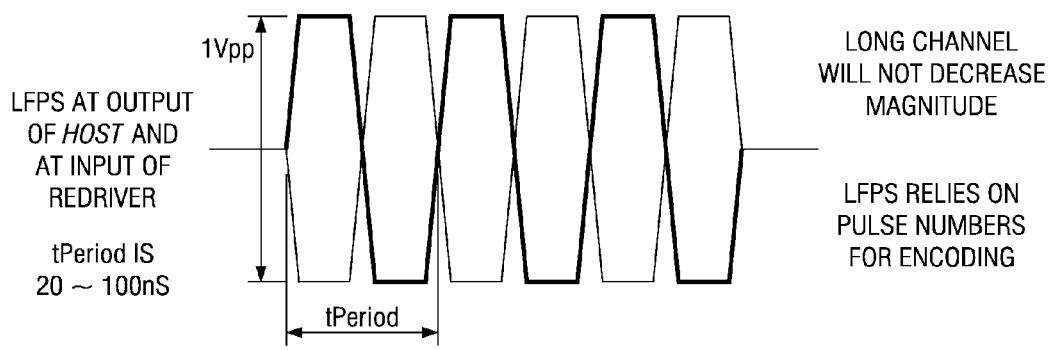
FIG. 2A illustrates a LFPS both as transmitted by a conventional USB 3.0 host and as substantially received at a conventional re-driver.

Turning to FIG. 2A, illustrated is a LFPS both as transmitted by a 3.0 USB connector and as substantially received at a de-emphasizer 300. As LFPS is a lower frequency than SuperSpeed, it is subject to less attenuation on a transmission channel, thereby remaining within the strictures of Table 6-20 of LFPS specification.

Figure 2B:
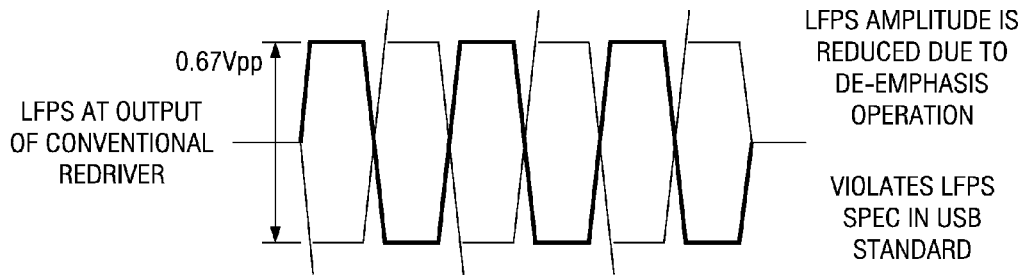
FIG. 2B illustrates a represents an LFPS output of a conventional USB 3.0 re-driver.

However, FIG. 2B represents an LFPS output of a conventional re-driver. As is illustrated, the LFPS signal is also attenuated. This is disadvantageous to LFPS signal strength. In the prior art, the prior art re-driver either applied de-emphasis to both the LFPS and SuperSpeed, thereby disadvantageously de-emphasizing the LFPS signal, which can be interpreted as a failure condition of a received USB 3.0 signal, or the prior art re-driver did not apply de-emphasis to either the SuperSpeed or LFPS, and the re-driven SuperSpeed signal integrity did not pass the strictures of Table 6-10 Transmitter Normative Electrical Parameters.

Figure 3A:
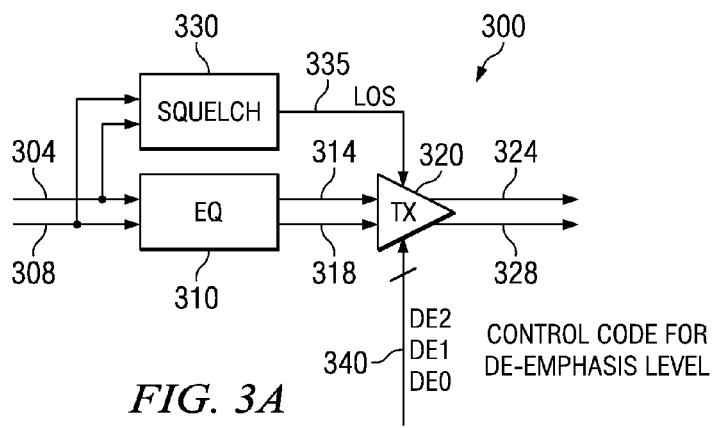
FIG. 3A illustrates a prior art re-driver.

FIG. 3A illustrates a prior art re-driver 300. An equalizer 310 has a first differential input line 304 and a second differential input line 308. The equalizer 310 has a first differential output line 314 and a second differential input line 318. A first and second input of a differential amplifier (TX) 320 is coupled to the first and second equalized differential outputs 314, 318 of the equalizer 310. A squelch circuit 330 is also coupled to the first differential output line 304 and a second differential input line 308. A loss of signal (LOS) line 335 is coupled to a LOS input of the TX 320. The amplifier 320 has a first transmitter differential output 324 and a second transmitter differential output 328. The LOS 335 disables the amplifier 320 should the squelch circuit 330 determine a loss of input signal has occurred.

The re-driver 300 further includes a control line 340. The control line 340 conveys de-emphasis control parameters through a de-emphasis control line 340. In the illustrated embodiment, de-emphasis control parameters ("DE0-DE2") is a 3 bit control word as an illustration of 3 different kinds of achievable de-emphasis levels, some may exceed 3.5 dB to create larger compensation ability in real life application. The de-emphasis control parameters convey a control code for de-emphasis level. However, in the prior art, there is no distinction regarding the control parameters 340 between a SuperSpeed and LFPS received over the first and second differential inputs 304, 308; SuperSpeed and LFPS signals are de-emphasized or not de-emphasized without a distinction made among each other.

Figure 3B:
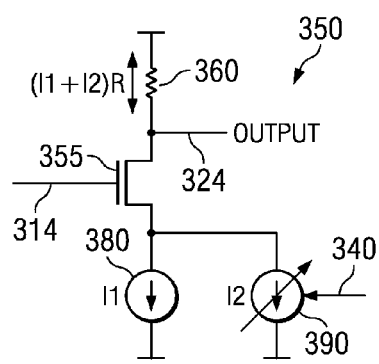
FIG. 3B illustrates part of the prior art circuitry of the amplifier 320 of FIG. 3A in more detail.

FIG. 3B illustrates part of the circuitry of amplifier 320 in more detail. An output voltage is derived through the resistor 360 that is the power supply referenced. A constant current source I1 380 and current source I2 390 sets a default output voltage of an emphasized bit on a node coupled to the differential output 324 after a voltage drop occurs over resistor 360.

As is illustrated, a gate of a NFET transistor 355 is coupled to the first equalized differential output 314. This increases or decreases the current drop through coupled resistor 360, with a variable current source 390 compensating for the increase or decrease of current through NFET 355.

Moreover, the current through I2 390 is affected by the (DE0-DE2) values. The current through I2 390 can be decreased proportionately when de-emphasis control parameters 340 are applied to any following non-emphasized bits of a signal. Therefore, the NFET 355 does not drive as large a voltage drop through the TX output line 324 when a non-null de-emphasis signal of de-emphasis line 340 has been applied.

FIG. 4 illustrates a USB 3.0 system 400 with a de-emphasizer 403, constructed according to the principles of the present application. The system has a USB 3.0 source 401 differentially coupled over a differential coupling 402 to a signal conditioner, such as the de-emphasizer 403, which can be a USB 3.0 re-driver. The signal conditioner 403 is differentially coupled over a differential coupling 498 to a USB 3.0 sink 499.

In one embodiment, the de-emphasizer 403 is used to differentiate between a SuperSpeed (in one example, 500 MegaHertz to 2500 MegaHertz) and a LFPS (in one example, 10 MegaHertz to 50 MegaHertz). In the de-emphasizer 403, a de-emphasis is enabled in a transmission output, such as a 3.0 USB transmission of the de-emphasizer 403, only when SuperSpeed is detected; otherwise, the de-emphasis is disabled. This can allow for a straightforward, low-cost and low-power implementation for disabling de-emphasis in an automatic fashion for LFPS, without disabling for SuperSpeed, as would occur under conventional implementations of the USB 3.0 Spec Table 6-10 and Table 6-20.

The de-emphasizer 403 includes a differential equalizer 410 having a first differential input 404 a second differential input 408 of the differential coupling 402. A differential amplifier 420 is coupled to a first equalized output 414 and a second equalized output 418 of the differential equalizer 410. Inputs of a squelch element 430 is also coupled to the first and second differential inputs 404, 408, and the squelch element 430 has a LOS output line 435 that conveys a LOS signal is coupled to both the differential amplifier 420 and a frequency detector 460.

In the de-emphasizer 403, the frequency detector 460 is coupled over a line 454 and a line 458 from the first and second differential inputs 404, 408, respectively, and also to the LOS line 435, as discussed above.

In the illustrated embodiment, the frequency detector includes a differential to single-ended signal (D2S) transformer 462, a counter 464, and a comparator 466.

Within the frequency detector 460, the counter 464 is coupled to an output of the D2S transformer 462. A reference clock signal input 467 is coupled to the counter 464. The comparator 466 outputs an LFPS_true or LFPS_not-true signal onto the LFPS_Exists line 470 into a first input of a logical combiner 480.

In the de-emphasizer 403, the logical combiner 480 has an output coupled to a control input 440 of the differential amplifier 420, wherein the logical combiner receives filtered de-emphasis parameters (DE0'-DE2') on a de-emphasis control input 490.

One example of an operation of the system 400 will be explained with use of FIGS. 5A-5F and FIGS. 6A-6F of the present application. FIGS. 5A-5F illustrate processing of a LFPS signal by the de-emphasizer 403, and FIGS. 6a-6F illustrate processing of a SuperSpeed signal by the de-emphasizer 403.

In FIG. 5A, a LFPS signal is received by the de-emphasizer 403, wherein previously, no differential signal was received, or was in "Electrical Idle Mode" (EID) as defined in USB 3.0 spec Table 6-11 and section 6.7.6 of the "Universal Serial Bus 3.0 Specification". In FIG. 5A, the outlines of received LFPS signal is illustrated with two outlines of single-ended signal overlapping together. Differentially the signal outline will be the subtraction of those two signals that complies to one of the "positive" signal that is subtracted from, which is in bold curve.

In FIG. 5B, a LOS signal 435 goes low (there is now a signal, a LFPS.) Therefore, the counter 462 is released from reset on this signal, although it can also be reset on other signals, as will be discussed below. Moreover, the LOS signal 435 starts a count of the counter 462.

In a FIG. 5C, the D2S of the LFPS signal occurs in the D2S 460. The D2S 460 converts a differential signal into a single-ended signal with rail-to-rail magnitude that complies to CMOS logic for the counting logic to function. The signal now is a CMOS signal with the profile of input differential signal as described previously.

In FIG. 5D, the reference clock signal 465 is received at the counter 462. Then, the counter 465 counts a number of clock transitions that occurs within a single D2S signal of FIG. 5C.

As per Table 6-21 in "Universal Serial Bus 3.0 Specification" there is an upper limit on how long the LFPS signal will burst, hence an upper limit of the counter 462. In the de-emphasizer 403, various approaches regarding avoiding an overflow of the counter 462 can be employed.

A first approach is for the counter 462 to have a high enough counting capacity that it will not overflow.

A second approach is to "set" through employment of a D-Flip Flop logic once the LFPS signal is detected to remember the state of LFPS present, which will only be reset once LFPS is not present or LOS is detected. In the system 400, a "counting window" is started wherein a first window is used to determine if a LFPS present. A following window is employed to increment the counter 462 once the LFPS is detected.

In FIG. 5E, a count of LFPS occurs.

In FIG. 5F, the comparator 466 determines if the count of the counter 464 is greater or equal to a threshold value, which can be an integer value of "one". If it does, the LFPS_true signal on the LFPS_Exists line 470 is generated; otherwise, an LFPS_not-true signal is generated. In the illustrated embodiment, this value is then inverted due to considerations of logic design.

Within the logical combiner 480, signals received over the LFPS_Exists line 470 creates the filtered DE0-DE2 parameters 490. If LFPS_true, such as illustrated in FIG. 5F, as determined by the comparator 464, then the DE0-DE2 parameters received over line 440 are masked. Therefore, the filtered de-emphasis parameters DE2'-DE0' of the filtered de-emphasis line 490 have a mask value of 000 (or some other value denoting no de-emphasis). Otherwise, the filtered de-emphasis parameters DE2'-DE0' 440 have the same value as the DE0-DE2 parameters received over line 440.

Turning to FIG. 6A illustrated are SuperSpeed signals as received by the de-emphasizer 403. The received signal is subjected to large attenuation and was only illustration with a tidy envelope present. The SuperSpeed signal received will be highly attenuated; hence it is very small and in the illustration therefore no clear outline exist.

In FIG. 6B, a LOS-True signal received over LOS line 435 goes low (there is now a signal, a SuperSpeed), and therefore a LOS-Not-true signal is generated. Therefore, the counter 462 is released from reset on this signal, although it can also be reset on other signals, as will be discussed below. Moreover, the LOS signal 435 starts a count of the counter 462.

In a FIG. 6C, the D2S of the SuperSpeed signal occurs in the D2S 460. However, unlike FIG. 5C, in FIG. 6C, there is no counting window. This occurs due to the design and nature of the D2S 462. As D2S 462 tries to convert a differential signal into single-ended format, it first performs a subtraction followed by amplifying the result within a reaction time. A SuperSpeed signal that is attenuated or too fast will not trigger the D2S to perform fully the function of conversion. As a result the output of D2S when reacting to the SuperSpeed will be a flat line, and no counting window would therefore exist. Moreover, the flat line of D2S signals the counter-exist proof of non-LFPS present.

Other signal conditioning can also happen before the output signal of the D2S 462 is sent to counter 464. One approach is to limit how fast the D2S will react by placing a bandwidth limiting function within the D2S 462, such as a Low-pass filter, to remove SuperSpeed frequency component.

In FIG. 6D, a free-running clock is running.

However, in FIG. 6E, a transition of the free clock does not occur within a D2S window; therefore, the counter 462 is not counting.

In FIG. 6F, therefore, the comparator 464 continues to output a LFPS_not-true signal (a low LFPS_true signal), and therefore the filtered de-emphasis values 490 are the same as the de-emphasis values 440, and de-emphasis can be applied to the SuperSpeed signal. The de-emphasis was set by user depends on how long the channel 498 will be.

In FIG. 7A-7D, illustrated are the outputs from 420 under the situation of LFPS present.

In FIG. 7A, a LFPS signal is received after no signal was received. In FIG. 7B, a LOS/Counter reset signal is output from 430 and present on line 435. This removes the reset control to the counter 462, wherein the counter 462 was already set to zero. In the illustration, there is about a 5 nanosecond window between the reception of the signal of FIG. 7A and the LOS signal going low in FIG. 7B.

In FIG. 7C, the LFPS_true value is then generated for a duration between an LFPS_not-true signal. However, there is an additional delay as the LFPS signal is processed and detected by the frequency detector 460.

In the system 400, a logic can be present in the de-emphasizer 403 that defaults to a no de-emphasis being applied condition from the start of any transmission of signal following an EID condition. This condition is only removed when both LFPS_true is low and LOS is Low. Therefore, in FIG. 7D, there is no de-emphasis on the output of LFPS pulses.

At the end of LFPS signal transmission, if followed by EID condition, the LOS/Counter Reset signal will be high from the squelch 430 and presented on line 435. This high signal will reset counter, and reset LFPS_true signal to low, so as to prepare for any new signal transmission.

Turning to FIGS. 8A-8D, illustrated are certain anomalies that can occur with employment of the system 400 if a previous signal was a LFPS followed immediately by a SuperSpeed. However, these anomalies nonetheless are acceptable within the strictures of FIG. 7-3 of "Universal Serial Bus 3.0 Specification", Revision 1.0, Nov. 12, 2008, included within as FIG. 10 of the present application, with any appropriate changes. Moreover, the differential de-emphasizer 403 will not degrade any data exchange in FIG. 8A-98D due to the longer than the period of anomalies duration of handshakes exiting from LFPS communication.

In a FIG. 8A, a previous signal, an LFPS, is followed immediately by a SuperSpeed.

In a FIG. 8B, a LOS/counter reset occurs after a 5 nanosecond or so delay. However, the counter is ready to count.

In a FIG. 8C, the LFPS_true signal is generated after another delay. The mechanism of D2S 462 will force the LFPS_true signal to go low. However, there is a reaction time when LFPS becomes SuperSpeed between the start portion of SuperSpeed and when the LFPS_true signal is reset to low. As described above, the D2S 462 will typically have features such as low pass filtering that limits it reaction speed. Other circuitry also needs certain reaction time to fully shut off LFPS_true signal. The reaction time is in tens of nanoSecond range in general design.

In FIG. 8D, as is illustrated, a reaction time of the LFPS_true being reset to low is present at the first entry of SuperSpeed signal. As a result there is no de-emphasis applied to SuperSpeed in the duration of the reaction time. De-emphasis will be applied to following SuperSpeed after a reaction time interval has passed. Advantageously, this is not a concern for normal data exchange as per FIG. 10, there is a long process of recovering and handshake to train the system 400 for accepting data when transforming from LFPS into SuperSpeed.

FIG. 9 illustrates an example method 900 of a use of filtered de-emphasis values, such as may be generated by a signal conditioner, such as de-emphasizer 403 of the system 400.

In a step 905, a differential line input is sensed. This can be a 3.0 USB differential line.

In a step 910, it is determined if there is a differential signal on the differential line, that upon a previous sensing had no signal. This can be performed by the squelch 430. If there is still no signal, the method 900 advances to a step 915, and a differential amplifier 420 is powered down, if the differential amplifier 420 is not already powered down. After the step 915, the method 900 then stops in a stop step 990.

In a step 917, the counter is reset after a LOS false signal is received. In a step 920, a conversion is applied that converts the received differential line input to a single input. In a step 930, a counter, such as the counter 464, is started on a first transition, such as an upwards transition, of a single-ended signal. This counter is driven by a reference clock signal. In a step 940, a counter is stopped on a sequential of upwards transition of the single-ended signal. This finished one counting window.

In a step 950, the differential signal is equalized. The signal is then conveyed to the differential amplifier.

In a step 955, de-emphasize parameters, such as de-emphasize parameters DE0-DE2 on line 440, are received by the logical combiner 480.

In a step 960, it is determined if the count of the counter 464 is greater to or equal to than a comparison values. If not, the LFPS_true signal is generated, and the method 900 advances to a step 965. If yes, the LFPS_not-true signal is generated, and the method 900 advances to a step 970.

In the step 965, the received de-emphasize parameters are conveyed to the differential amplifier as filtered de-emphasized parameters, without masking, as there is an LFPS signal being received by the re-driver 403, i.e., LFPS_true. Alternatively, in a step 970, the de-emphasize parameters are masked and this mask value is conveyed as the filtered de-emphasized parameters to the differential amplifier. i.e., LFPS_not-true.

In a step 980, the differential amplifier amplifies the differential signal and applies de-emphasis according to the filtered de-emphasis parameters. The method 900 stops in a step 990.

FIG. 10 illustrates a full state machine from USB 3.0 spec. The USB 3.0 normal operation mode U0, several power saving operation modes of U1, U2 and U3 all have LFPS Handshake transaction that requires LFPS signal to be transmitted, leading to a "Recovery" state. Leading out of the "Recovery" state, only a "Training" transaction will have FIG. 8 situation of "LFPS followed by SuperSpeed". The "Training" transaction will last up to 2 mS where as short reaction time in nanosecond range shown in FIG. 8D has no impact. This is a double assurance that the re-driver using the method 900 remains transparent to whole signal path. Other transactions that incorporate LFPS signal have no high speed signal following.

Those skilled in the art to which this application relates will appreciate that other and further additions, deletions, substitutions and modifications may be made to the described embodiments.

What is claimed is:

1. An apparatus, comprising:
a differential equalizer having:
a) a first differential input,
b) a second differential input,
c) a first differential output, and
d) a second differential output;
a frequency detector coupled to the first and second differential inputs;
an amplifier coupled to the first differential output and the second differential output of the differential equalizer; and
a logical combiner having a first input coupled to an output of the frequency detector and an output coupled to a control input of the amplifier, wherein the logical combiner can mask at least one received de-emphasis parameter.

2. The apparatus of claim 1, further comprising a squelch element coupled to the differential equalizer and the frequency detector.

3. The apparatus of claim 1, wherein the frequency detector comprises:
a) a differential to single-ended signal transformer; and
b) a counter coupled to an output of the differential to single-ended signal transformer.

4. The apparatus of claim 3, further comprising a clock signal input coupled to the counter.

5. The apparatus of claim 4, wherein the counter is reset upon an upwards transition of a clock signal of the clock signal input.

6. The apparatus of claim 4, wherein the frequency detector comprises a comparator that outputs an LFPS_true or LFPS_not-true signal into the first input of the logical combiner.

7. The apparatus of claim 6, wherein the logical combiner generates a no-de-emphasis signal to the amplifier upon a reception by the logical combiner of the LFPS_true signal.

8. The apparatus of claim 1, wherein the logical combiner receives de-emphasis parameters on a second input, which can be blocked by an LFPS_true signal on the first input of the logical combiner.

9. The apparatus of claim 1, further comprising wherein the amplifier de-emphasizes at least the first transition of a high pass periodic function signal as determined by an unblocked de-emphasize parameter.

10. The apparatus of claim 1, wherein the differential line is a USB 3.0 protocol type bus line.

11. An apparatus, comprising:
a differential equalizer having a first differential input and a second differential input;
an amplifier coupled to a first differential output and a second differential output of the differential equalizer;
a logical combiner having an output coupled to a control input of the amplifier, wherein the logical combiner receives de-emphasis parameters on a first input;
a frequency detector coupled to the first and second differential inputs, the frequency detector including
a) a differential to single-ended signal transformer,
b) a counter coupled to an output of the differential to single-ended single transformer,
c) a clock signal input coupled to the counter,
d) a comparator that outputs an LFPS_true or LFPS_not-true signal into a second input of the logical combiner;
an amplifier coupled to the first differential output and the second differential output of the differential equalizer; and
a squelch element having an output coupled to the differential equalizer and the comparator.

12. The apparatus of claim 11, wherein the counter is reset upon an upwards transition of a clock signal of the clock signal input.

13. The apparatus of claim 11, wherein the logical combiner masks a conveyance of de-emphasis parameters to the amplifier upon a reception by the logical combiner of the LFPS_true signal.

14. The apparatus of claim 11, wherein the differential line is a USB 3.0 protocol type bus line.

15. A method, comprising:
sensing a differential signal;
applying a differential to single-ended conversion on the differential input to create a single-ended signal;
counting a number of transitions of the single-ended signal in a time period;
determining if the count of the number of transitions is higher than a comparison value;
generating an LPFS_not-true signal if the count of the number of transitions is not higher than a comparison value;
receiving a de-emphasis parameter; and
blocking a conveyance of the de-emphasize parameter to an amplifier of the differential signal if the LFPS_not-true signal has been generated.

16. The method of claim 15, further comprising:
equalizing the differential signal before amplifying the differential signal.

17. The method of claim 15, further comprising powering down an equalizer if no differential signal is sensed.

18. The method of claim 15, further comprising conveying the de-emphasize parameter to the amplifier of the differential signal if LPFS_true signal has been generated.

19. The method of claim 18, further comprising amplifying the differential signal as determined either by the masking or the conveying of the de-emphasis parameters.

20. The method of claim 15, wherein the differential signal is received across a USB 3.0 protocol type bus line.

* * * * *